United States Patent [19]

Rightley

[11] Patent Number: 4,722,268

[45] Date of Patent: Feb. 2, 1988

[54] FOOD WARMER CABINET CONTROL

[75] Inventor: Ronald R. Rightley, New Albany, Ind.

[73] Assignee: Properties Leasing Co., Inc., Louisville, Ky.

[21] Appl. No.: 818,098

[22] Filed: Jan. 10, 1986

[51] Int. Cl.⁴ .................... A21C 13/00; A21D 6/00
[52] U.S. Cl. .................................. 99/468; 99/467; 99/473; 219/401
[58] Field of Search .......... 99/447, 467, 468, 473–476, 99/483, 516; 34/195–198; 126/20, 21 A, 21 R, 281, 369; 219/400, 401, 362, 385–387; 312/236

[56] References Cited

U.S. PATENT DOCUMENTS 3,424,231 1/1969 Truhan ........................... 219/400 X
4,623,780 11/1986 Shelton ........................... 219/400 X Primary Examiner—Timothy F. Simone
Attorney, Agent, or Firm—Edward M. Steutermann

[57] ABSTRACT

Control means and method for controlling the characteristics of the operation of a food processing device by selective adjustment of temperature and vapor pressure including a chamber to hold food in process, a reservoir to hold water to be evaporated to the air in the chamber where a first heater is located in the reservoir to selectively provide heat of vaporization to the water to be evaporated, and second heater is supplied to heat air supplied to the chamber to increase the temperature of the air to a second temperature where the control means are provided to regulate time periods for which energy is supplied to the first and second heaters to control the humidity and temperature in the chamber.

5 Claims, 3 Drawing Figures

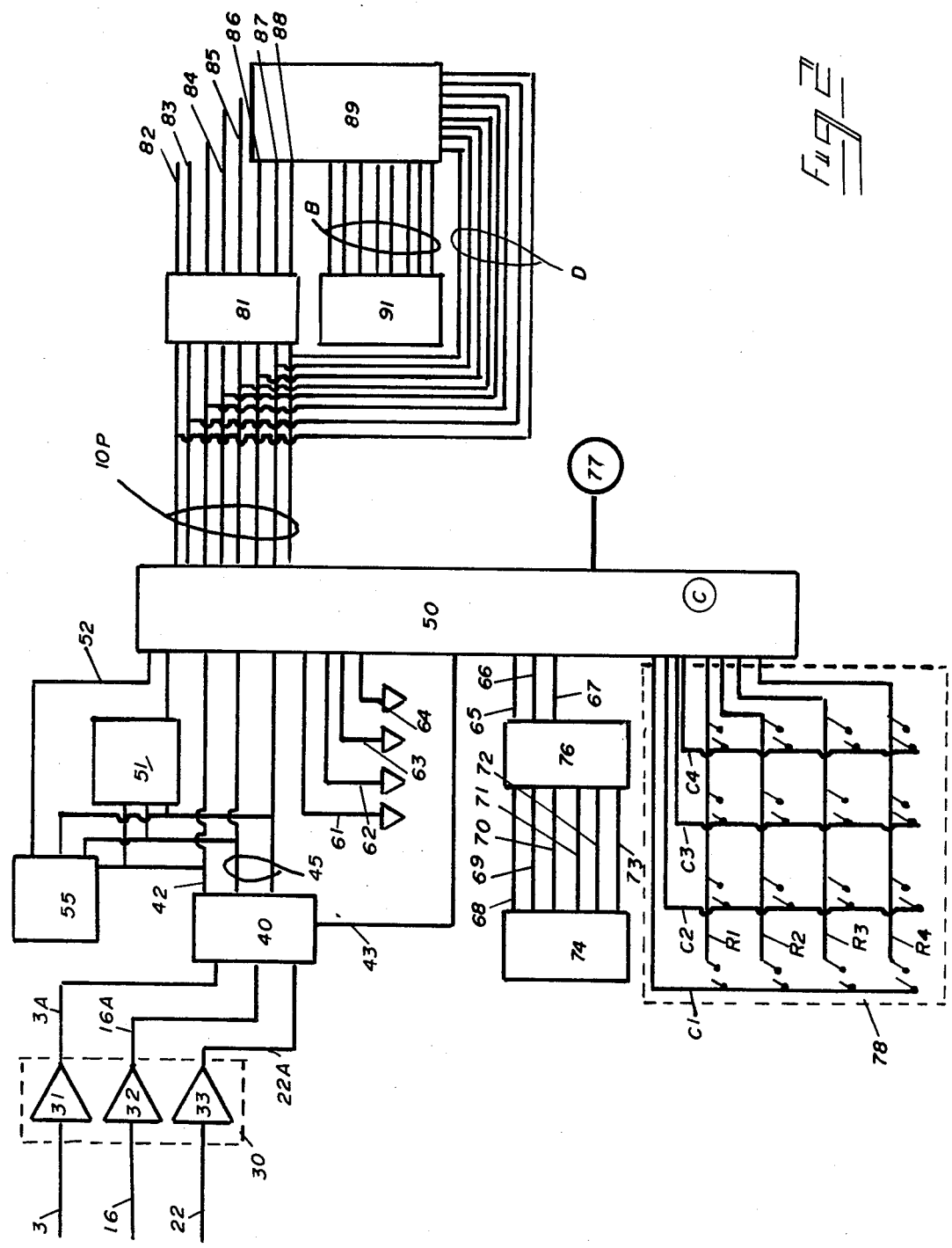

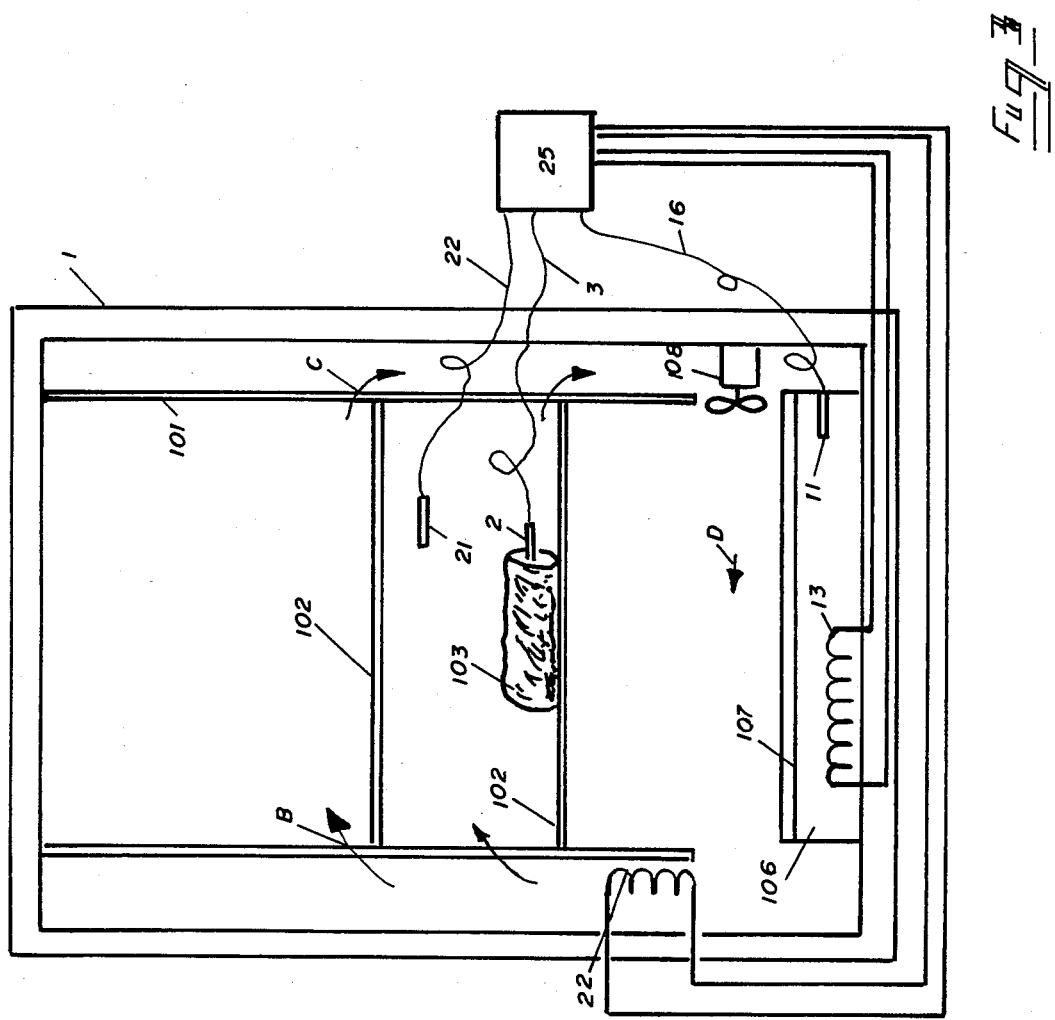

FOOD WARMER CABINET CONTROL

BACKGROUND OF THE INVENTION

The present invention relates to control means and methods for food processing devices useful for cooking, storing or modifying food at selected conditions of temperature and humidity until the food is to be served. Devices within the scope of the present invention have been found useful where food is to be processed, cooked, proofed (as described hereinafter) or held under controlled conditions or and combination thereof.

With the increasing popularity of "fast food" establishments where food is precooked for later sale, there is a demand for food holding devices to maintain food at substantially uniform temperature for selected periods of time while preserving the taste, moisture content, texture and quality of the food. Further in other applications it is desirable to be able to restore food, particularly baked goods, to acceptable quality after long storage periods.

In many instances storage of "fast foods" is particularly difficult because heat loss, bacteria growth and moisture loss experience by the food at storage conditions provided by prior art devices, particularly where the food is to be stored warm, contribute to rapid deterioration of the food.

More particularly, it has been found that air circulation characteristics and improper storage temperature contribute significantly to bacteria growth and excessive loss of moisture which leads to food shrinkage, so that in improper storage atmosphere the food deteriorates after only a short period of time and loses its tenderness, appetizing taste and appearance.

In accordance with another feature of the present invention it has been found that even where food is stored under favorable conditions in an enclosure, the food deteriorates at a rate dependent on the time the door to the enclosure is opened so the storage chamber is exposed to the ambient atmosphere.

Additionally, it is known that in storage of some foods such as fried chicken or fish where a crust is provided, it is particularly desirable to maintain the crispness of the crust while minimizing the moisture loss from the underlying meat. Storage of such foods tends to require the satisfaction of seemingly mutually exclusive conditions, to hold the crispness of the crust by maintaining low moisture content in the crust while minimizing moisture loss from the food. In such foods excessive moisture loss results in shrinkage and loss of tenderness and adversely affects the texture of the meat. This can be prevented by controlling the temperature and humidity of the storage atmosphere. The problem is to prevent moisture flow from the underlying food to the crust while holding the crust in low moisture content.

The prior art demonstrates various means for storing food such as shown in U.S. Pat. No. 4,038,968, U.S. Pat. No. 3,955,077, but neither provides for selective humidification and temperature control of warm moist air passed around a food by regulating the application of energy to a heater in a water reservoir or to an air heater to maintain the food at a uniform temperature while attempting to maintain moisture in the food.

Additionally, U.S. Pat. No. 3,955,007 utilizes a moisture container assembly mounted in a heat holding compartment located above a gas burner assembly where the amount of moisture added to the circulating air bears no relationship to the temperature of the air so the moisture content is subject to change with the rate of the heat supplied to the humidifier.

One arrangement for maintaining the moisture content and temperature of food products and for slowly cooking foods in some applications is shown in copending U.S. Application Ser. No. 521,344 filed Aug. 8, 1983.

It is further recognized that prior art devices which provide only saturated air to a storage compartment do not recognize the dynamics of food storage and can lead to situations where breading crust, or other materials on the surface of a food product become soggy so the food looses its appeal even though the underlying meat may not loose its moisture. Or in some instances the food product loses its moisture to the crust so the worst possible situation arises. Such problems are further compounded when the food is frequently exposed to the atmosphere as by the door to the storage compartment.

One known prior art reference U.S. Pat. No. 2,318,027 Sykes teaches a dehydration device where temperature and humidity are controlled in an enclosure by sensing wet bulb and dry bulb temperatures and spraying steam into a water reservoir to increase humidity. The use of heaters to maintain selected water reservoir temperature is not taught.

Another prior art reference, U.S. Pat. No. 3,245,461 Allington, teaches a control arrangement to maintain humidity by monitoring wet bulb and dry bulb temperatures where cooling or heat is supplied to a water reservoir in response to change in wet bulb and dry bulb temperature. Nowhere does the reference recognize the value of the use of the reservoir temperature as a means of controlling the treatment of food.

U.S. Pat. No. 3,518,949 Stock teaches an arrangement for conditioning dough etc. where a first control is provided to control air temperature in an enclosure by operation of a heater, second temperature control means are provided to limit the maximum temperature adjacent the heater and a humidity responsive switch is provided to energize a heater in a water reservoir to vaporize water to adjust humidity. Stock, like Allington and Sykes, does not teach control of the water temperature. Additionally, Luce U.S. Pat. No. 2,939,423 controls humidity by controlling temperature of the air and water but does not independently control air and water temperature. U.S. Pat. No. 3,424,231 Truhan, teaches controlling air and water temperatures but sprays water into the air, saturating the air at the water temperature rather than relying upon the exposed surface of the water in the reservoir to emit vapor into the air.

No prior art device is known which recognizes the advantages of simultaneous control of humidity and temperature of the air in a food storage compartment to maintain control of the quality of the food and even permit cooking of the food by periodic alternate and/or cycled variations in the application of energy to heating devices which control the temperature and vapor pressure of the atmosphere to which the food is exposed.

SUMMARY OF THE INVENTION

The present invention provide a new and useful method and apparatus for food processing including cooking, storage, or reconditioning where provision is made to control the rate of moisture evaporation from a reservoir located within a food holding chamber and the temperature of the air within the chamber to adjust the food processing condition and periodically adjusting the time of supply of energy to the heaters to adjust the condition to achieve heretofore unabtainable food characteristics.

Within the scope of the present invention, it is recognized that in the dynamics of food processing, processing time alone does not determine the quality of the food product, but rather the rate of change of conditions such as temperature and humidity do affect the characteristics.

The present invention recognizes the importance of control of temperature and humidity within well defined limits and the importance of selected variation of these parameters in determining the quality of the food product. Additionally it has been unexpectedly found that by proper cycling of heat supplied to a water reservoir which supplies water for evaporation to a food holding chamber and by controlling the ambient temperature in the chamber and by proper cycling of the heat supplied to the chamber and the reservoir, food products particularly, bakery products can be reconstituted.

Additionally, it has in some instances, been found particularly helpful to control the application of heat to the ambient air as well as to the heater in the water reservoir in response to the temperature of the food itself.

More particularly, the present invention provides control means and method for controlling the operating characteristics of a food processing device by selective adjustment of temperature and vapor pressure including a chamber to hold food, a reservoir to hold water to be evaporated to the air in the chamber where a first heater is located in the reservoir to selectively provide heat of vaporization to the water to be evaporated, and second heater is supplied to heat air supplied to the chamber to increase the temperature of the air to a second temperature where the control means are provided to regulate time periods for which energy is supplied to the first and second heaters to control the humidity and temperature in the chamber.

One example within the scope of the present invention is shown in the accompanying drawings and described hereinafter, it being understood that the arrangement shown is by way of illustration only and not by way of limitation.

BRIEF DESCRIPTION OF THE DRAWINGS

In the one example in accordance with the present invention discussed hereinafter:

FIG. 2 is a detailed schematic diagram of the arrangement shown in FIG. 1.

FIG. 3 is a cross section view of one example of a food processing device within the scope of the present invention.

DETAILED DESCRIPTION OF THE DRAWINGS

Figure 1:
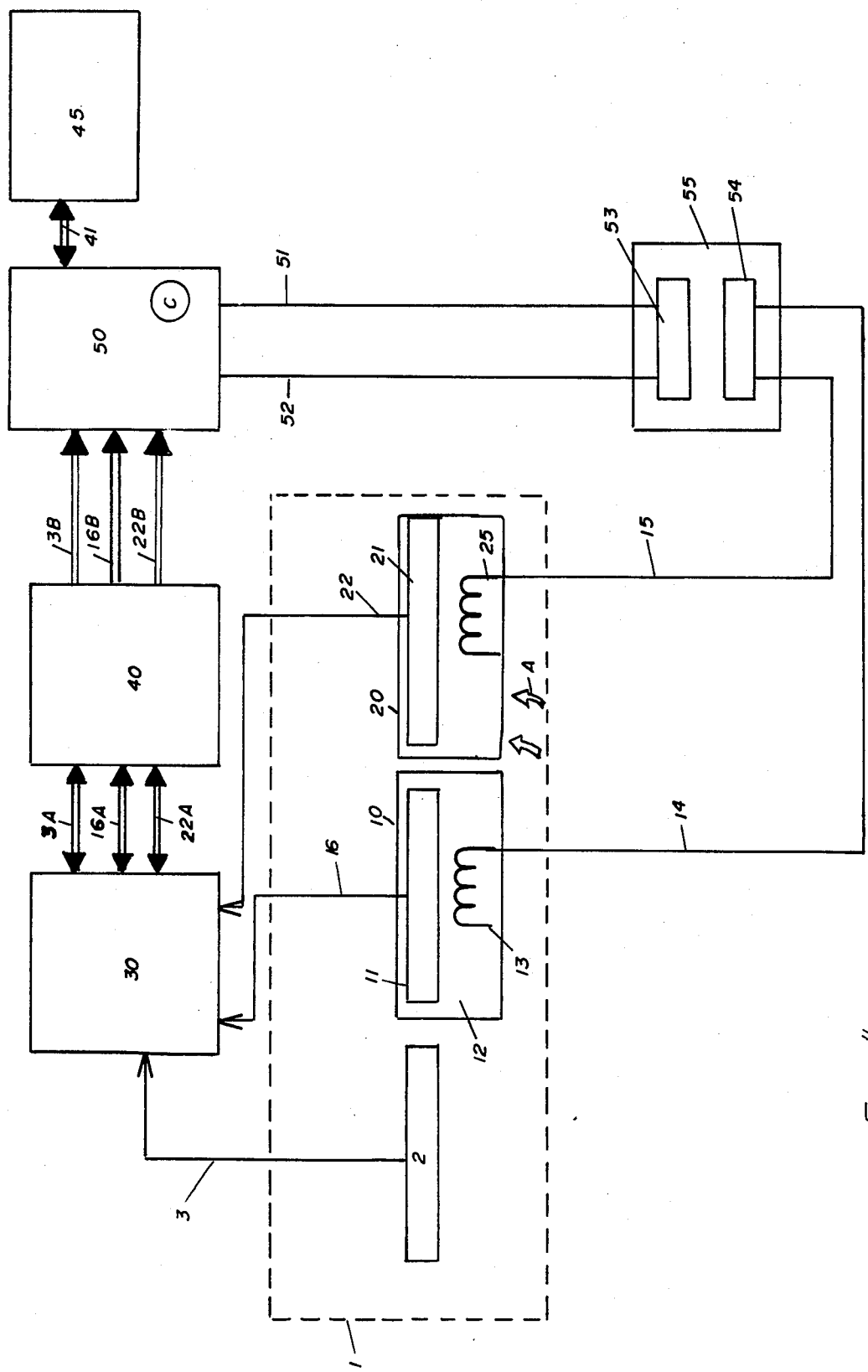
FIG. 1 is a block diagram illustrating an arrangement within the scope of the present invention.

Referring first to FIG. 1 which presents a block diagram illustration of one example of a device within the scope of the present invention, a food chamber 1 which is adapted to hold food to be processed as described hereinafter is indicated by dotted lines showing at least one thermocouple food probe 2, a water heater arrangement 10 and an air heater arrangement 20 which are provided within the cabinet.

The water heater includes a thermocouple 11 which is located within the water reservoir 12 where a water heater 13 is located also within the water reservoir 12. Reservoir 12 holds water to be evaporated into the atmosphere of the cabinet 1 by heater 13. A power input 14 is supplied to the water heater. A thermocouple output 16 is provided from thermocouple 11 to an amplifier system 30 described hereinafter to supply a signal indicative of the temperature of the water in the reservoir.

The thermocouple food probe 2 can be inserted into the food or other material to be processed, not shown, to directly reflect the temperature of the material. An output 3 from the thermocouple 2 is supplied to the thermocouple amplifier 30.

Likewise, within cabinet 1 an air heater assembly 20 is provided having a thermocouple 21 to measure the temperatrue of the air in the cabinet where air represented by the arrows A passes through an air heater 25 and over the thermocouple 21. A signal 22 is provided from thermocouple 21 to the amplifier 30.

Typically, the temperatures supplied from the thermocouple food probe 2, the water thermocouple 11 and the air temperature thermocouple 21 are used to monitor and modify the conditions of the atmosphere in cabinet, as described hereinafter. The signals are typically analog signals represented by the arrows 3A, 16A, and 22A and can be supplied to an analog-to-digital converter 40 where digital signals 3B corresponding to the signal 3A, 16B corresponding to signal 16A and 22B corresponding to signal 22A are supplied to a microprocessor 50 which interprets the temperatures received, compares the temperatures with a program in the microprocessor and supplies output signals 51–52 through an isolation unit 53 to relays, for example solid state AC switches 54 provided within a power control system 55 to selectively operate air heater 13 and water heater 22 as required by the microprocessor in response to changes in temperature and to time as measured by a clock C which is carried onboard the microprocessor 50.

Thus within the scope of the invention, the controller can, by switching the power supply to heaters 13 and 22, regulate the on and off time of the heaters to control the temperature and humidity in the enclosure thus providing heretofore unavailable food processes. A display 45 can be provided to indicate the status of the various features of the unit either continuously or on demand.

In respect to the general outline of the processes shown in FIG. 1, FIG. 2 is a more detailed schematic of one arrangement which can be utilized in accordance with the present invention, but it will be understood the example is not presented by way of limitation.

In this regard, FIG. 2 illustrates signal inputs 3, 16, and 22 from the food thermocouple 3, the thermocouple 11 in the water, and the thermocouple 21 in the air, respectively, provided through the amplifier bank 30 which as illustrated in FIG. 2 can include three amplifiers, 31–33.

The outputs 3A, 16A, 22A, are fed to the analog-to-digital converter 40 where a clock signal 42 and data signals 45 are output from the converter 40. Signal 43 is provided likewise from the A/D converter 40 to microprocessor 50 as described hereinafter.

The data signals 45 and clock signal 42 are likewise supplied to microprocessor 50 and to a memory device 55, for example, a read only memory device part number NMC9345N which is provided to retain the data.

The data and the clock signal are likewise provided to a visual display 77 which displays the instantaneous data, information input from a data pad 78 (described hereinafter), and other data where the display can default to a selected variable, for example, the cabinet temperature in the abstence of requested data.

Status outputs 61-64 are provided from microprocessor 50 to indicate various occurrences or conditions in the unit such as when the food in process is ready to be removed, when a door is open, when the water in the reservoir 12 is low or when food within enclosure must be removed.

As described hereinafter, the control unit 50 can be programmed to operate on a selected number of programs which are selected by entry to the data pad 78. A usual indication can be provided to indicate which of the programs is selected, where for example the device can be adapted to select anyone of six programs. Data from the microprocessor is provided on lines 65-67 to a flip-flop device 76, for example part 74HC137 to provide six outputs 68-73 to a visual readout 74 to indicate which of the programs is in operation.

The data pad 78 is provided for entry of signals to initiate various of the functions performed by the control device or to program the microprocessor and in this connection, as is known in the art, includes four columns C1-C4 and four rows R1-R4 so that the eight inputs are supplied to the microprocessor 50 and operated as binary combination to instruct the microprocessor for example to select a program to be operated by the device and to provide other instructions such as which overall function is to be conducted by the unit.

A clock C can be provided to microprocessor 50 for timing as known in the art and inputs 10P are provided to IOP (input/output ports) of the microprocessor 50, first of all to flip-flop 81, for example a part number 74C374 and where outputs 82, 83, 84 which are operated by IOP from the microprocessor 50 operate the power supply to the water heater and the air heater in the unit. Three of the outputs 86, 87, 88 can be supplied along with outputs B from a second flow-through latch 91, for example a part number 74C373 to the addresses to a memory device 89, for example a eraseable programable read-only memory where the programs to be conducted by the device have been stored. The data outputs D from the EPROM 89 are then supplied to the IOP ports of the microprocessor to permit the microprocessor to step through its functions and provide outputs to, for example, operate the heater 13 to adjust the vapor pressure in the atmosphere in which the food is placed so that the rate of evaporation of moisture from the food is controlled.

Each program can be adapted to provide a number of stages of humidity during a single cooking cycle so that, for example in the case of meat, the humidity in the cabinet can be adjusted in accordance with either the time during which the cooking has been in effect or the temperature sensed by the temperature probe 2. The processor controller can also independently adjust the temperature in the cabinet and maintain the proper balance between the humidity and the cabinet temperature to provide numerous cooking or food processing combinations.

FIG. 3 illustrates schematically an arrangement within the scope of the present invention. Enclosure 1 is shown which includes a inner cabinet 101 having shelves 102 on which in the example shown, food 103 rests for cooking. Air stream B which has been treated as described hereinafter as to temperature and humidity is passed into enclosure 101 over shelves 102 for emission as gas C to be treated.

The air temperature thermocouple 21 is shown connected by means of lead 22 to a controller 25 which includes the processes illustrated in FIG. 1 and 2.

The food probe 2 is likewise illustrated as is the lead 3 which supplies the signal from the probe 2 to the control system 25. Additionally, the water thermocouple 11 is shown connected by means of a lead 16 to the control 25. Heater 13 is shown located in a reservoir 106 which contains water 107. Air heater 22 is shown in the arrangement and is provided to heat the air stream D which flows over the reservoir 106 and can be impelled either by a fan 108 or within the scope of the present invention it has been found that natural convective currents provide sufficient air movement in most instances for satisfactory operation of the device.

Accordingly, the cabinet air is circulated, either by air moving means 108 or by convective forces, over reservoir 106 where vapor from the reservoir is mixed with the air stream which is then heated additionally by the heater 22 for passage into the enclosure 101.

Further, while the foregoing description is presented with reference to electronic control, generally equivalent operating sequences could be accomplished by mechanical, pneumatic or other means.

It will further be understood that the foregoing are a few examples of arrangements within the scope of the present invention and that other arrangements, also within the scope of the present invention, will occur to those skilled in the art upon reading the disclosure set forth hereinafter.

The invention claimed is:

1. An apparatus for controlling temperature and relative humidity of the internal environment of a food processing device comprising:
   a chamber to hold food;
   reservoir means to hold water to be evaporated into said chamber;
   first heater means located in said reservoir to provide heat to said water in said reservoir;
   second heater means to heat air in said chamber;
   first temperature sensing means to measure the temperature of said water in said reservoir;
   second temperature sensing means to measure the temperature of said air in said chamber;
   reference temperature means to generate reference air temperature and reference water temperature signals;
   control means to receive at least one of said reference air temperature signals and reference water temperature signals;
   where said control means controls energy supplied to said first and said second heater means by cyclically turning said first and second heaters on in response to said temperatures signal,to control said water temperature at a selected temperature and control said second heater to maintain a selected differential between said air temperature and said water temperature and where said control includes means for the temperature to be maintained by at least one of said first and second heaters to be automatically changed on at least one occasion during food processing to provide a sequence of different stages of air and water temperatures in said chamber.

2. Invention of claim 1 where the time at which a change is made in the power supplied to one of said first or second heaters is based on the time elapsed from a selected reference time.

3. The invention of claim 1 including: food temperature sensing means located in said chamber to measure the temperature of food located in said chamber where said change in power supplied to one of said first and second heaters occurs when said food reaches a predetermined temperature.

4. The invention of claim 3 wherein said control means includes control means to terminate power supply to said first and second heater means during a portion of the time that said food temperature sensing means is measuring said food temperature.

5. Control system for a cabinet for processing and holding foods under conditions of independently controlled air temperature and air moisture content wherein said cabinet has a reservoir means to receive water whereby a portion of the water surface is exposed to air circulated through said cabinet, first water heater means operated by first control means responsive to temperature of water within the reservoir; air heater means operated by second control means responsive to temperature of air in said cabinet; master control means adapted to vary the power applied to at least one of said first and second heaters during the time such heater condition is operative whereby maximum power is supplied to at least one of said first and second heaters when a large differential temperature exists between the desired temperature of one of said air temperatures and said water temperatures and where said power is diminished to a predetermined lower power rating as said temperature differential is reduced where in said power supply is alternating current power supply and said power is directed to at least one of said first and second heaters during a number of half cycles of said current which cycles represent the desired fraction of a total number of half cycles in a predetermined number of full cycles.

* * * * *